United States Patent Office 3,287,397
Patented Nov. 22, 1966

3,287,397
P,p′ SUBSTITUTED BENZHYDRYLIDENE CYCLOALKANES
Knut Gunnar Olsson, Hans Erik Alfred Wahlstam, and Bertil Sundbeck, all of Celsiusgatan 35, Malmo, Sweden, and Ernst Herbert Bárány, Hallbygatan 28A, and Jean Francois Miquel, Studentvagen, 1A, both of Uppsala, Sweden
No Drawing. Filed Nov. 15, 1961, Ser. No. 152,625
Claims priority, application Great Britain, Nov. 22, 1960, 40,123/60
9 Claims. (Cl. 260—479)

This invention relates to novel chemical compounds having pharmacological activity which may comprise estrogenic and antiestrogenic activity and inhibition of gonadotrophins from the pituitary gland, as well as processes of preparing the same. In particular, said compounds are p,p′-substituted benzhydrylidene cycloalkanes which may be represented by the following general formula

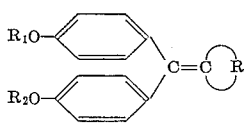

(I)

wherein R is a member selected from the group consisting of saturated straight and branch-chained alkylene radicals containing from three to eight carbon atoms in the molecule and wherein $R_1$ and $R_2$ are similar and dissimilar members selected from the group consisting of hydrogen, alkyl radicals containing from one to six carbon atoms, alkenyl radicals containing from two to six carbon atoms and phenylalkyl radicals in which the alkyl radical contains from one to three carbon atoms, saturated and unsaturated, straight and branch-chained alkane carbonyl radicals containing from one to eighteen carbon atoms, cyclopentane and cyclohexane carbonyl radicals and radicals of carbonic, sulphuric and phosphoric acids. The new compounds may be regarded as p,p′-dihydroxybenzhydrylidene cycloalkanes, their mono and bis-ethers, their mono and bis-esters and their mono-ether-monoesters.

The invention also includes compounds wherein at least one of the radicals $R_1$ and $R_2$ is derived from a polybasic acid, including both organic polybasic carboxylic acids and carbonic, sulphuric and phosphoric acids. In these compounds the remaining free acid radicals may be converted to the corresponding salts of alkali metals, alkaline earth metals, ammonia or amines, for example.

In the new benzhydrylidene compounds of the invention R may be a saturated straight or branch-chained alkylene (polymethylene) radical containing from three to eight carbon atoms. As examples of suitable alkylene radicals there may be mentioned trimethylene, 1 or 2-methyltrimethylene, 1,3-dimethyltrimethylene, tetramethylene, 2-ethyltetramethylene, 1,4-dimethyltetramethylene, pentamethylene, 3-methylpentamethylene, 2,3-dimethylpentamethylene, 2-methyl-4,4-dimethylpentamethylene, 3-iso-propylpentamethylene, hexamethylene, 1,6-dimethylhexamethylene, heptamethylene and octamethylene radicals.

When $R_1$ and $R_2$ in the above general Formula I are hydrogen atoms each phenyl group contains a free hydroxy group in the p-position. One of these two p-hydroxy groups or both may be alkylated with similar or dissimilar alkyl groups containing from one to six carbon atoms, such as methyl, ethyl, propyl, iso-propyl, n-butyl, tert.butyl, n-amyl, iso-amyl, for instance 2-methylbutyl, and cyclohexyl, alkenyl groups containing from two to six carbon atoms, such as allyl and crotonyl, phenylalkyl groups in which the alkyl radical is straight or branched and contains from one to three carbon atoms, e.g. benzyl, phenethyl, and phenylisopropyl.

Said p-hydroxy groups may also be mono or diesterified, for instance with alkanoyl or alkenoyl radicals containing from one to eighteen carbon atoms, such as formyl, acetyl, propionyl, pivaloyl, caproyl, palmitoyl, stearoyl, undecenoyl and oleyl, cyclopentane and cyclohexane carbonyl radicals, or with aroyl radicals, such as benzoyl radicals, or with aralkanoyl radicals such as phenylpropionyl, cinnamoyl radicals and the like. They may also be mono or diesterified with polybasic organic acids such as succinic, maleic, tartaric, citric, hexahydrophthalic acids or the like, and with carbonic, sulphuric and phosphoric acids such as ortho-phosphoric acid. When an organic or inorganic polybasic acid has been used for the mono or diesterification of the hydroxy group or groups the remaining free acid groups may be converted to salts of pharmaceutically acceptable cations such as Na, K, Ca and ammonium.

The free acid used for the esterification may in advance be converted to another suitable derivative such as a half-ester or half-amide. Upon esterification it is also possible to convert any remaining free acid radical to a half-ester or half-amide.

Thus, in accordance with the above one of said p-hydroxy groups may be etherified while the other is esterified to form mixed mono-ether-monoesters, wherein the ether and ester radicals are the same as those mentioned above.

The invention also includes all steric isomers comprised by the general Formula I.

The new compounds of the invention having the general Formula I may be prepared according to methods known per se for preparing similar compounds. A useful method broadly comprises using as the starting material a compound having the general formula

(II)

wherein $R_1$, $R_2$ and R have the meanings hereinbefore defined and wherein one of the symbols $R_3$ and $R_4$ represents hydrogen and the other a member of the group consisting of OH and esters thereof and halogens, such as Cl and Br. When using such a starting compound the benzhydrylidene cycloalkanes having the general Formula I are prepared by splitting off a compound of the formula $R_3$–$R_4$ so as to form a double bond between the carbon atoms to which the groups $R_3$ and $R_4$ are attached.

The invention therefore also comprises a process of preparing the compounds having the general Formula I. According to a preferred feature of the invention said compounds are prepared using carbinols having Formula II above as the starting material, viz. wherein one of the symbols $R_3$ and $R_4$ represents hydrogen and the other a hydroxy group.

Said carbinols of the general Formula II are novel compounds and are included within the scope of the invention. They are preferably prepared by an organometal reaction and most preferably by a Grignard reaction. In the last-mentioned case the carbinols having the general Formula II may be prepared from ketones and esters as can be seen from the following description of the process preferably used.

(I) According to one embodiment of the invention ketones are used having the general formula

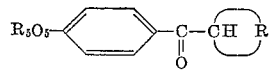

(III)

wherein R has the meaning hereinbefore defined and $R_5$ is the same as $R_1$ with the exception that it may not represent an acid radical.

Said ketones of Formula III may be prepared by reacting an acid of the formula

(IV)

wherein R has the meaning hereinbefore defined, or the corresponding chloride with phenol or a phenylalkyl ether in the presence of a suitable catalyst, for example aluminum trichloride or boron trifluoride.

Said ketones of Formula III may also be prepared by oxidation of alcohols having the general formula

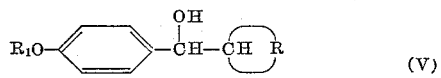

(V)

for example by the use of chromium trioxide as the oxidation agent.

As examples of suitable ketones of the general Formula III there may be mentioned p-hydroxyphenyl cyclobutyl ketone, p-methoxyphenyl cyclopentyl ketone, p-hydroxyphenyl-(4-methylcyclohexyl)ketone, p-benzyloxyphenyl cyclohexyl ketone, p-methoxyphenyl-2,4-dimethyl cyclobutyl ketone, p-hydroxyphenyl cyclononyl ketone and the like.

The ketones of Formula III are reacted with a Grignard reagent having the general formula

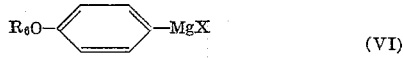

(VI)

wherein $R_6$ is the same as $R_2$ in Formula I above with the exception that $R_6$ may not be hydrogen or an acid radical, and wherein X represents chlorine, bromine or iodine. Said Grignard reagents are prepared in conventional manner by reacting a compound having the general formula

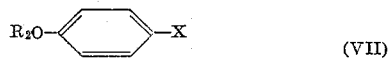

(VII)

with magnesium in a suitable form such as magnesium turnings in an ether, such as diethyl ether.

Upon reaction of the ketones of Formula III with the Grignard reagent of Formula VI in conventional manner the magnesium complex formed is decomposed in the usual manner to form the desired carbinol, for example by the addition of water or dilute acids, such as dilute hydrochloric acid or an aqueous solution of ammonium chloride. The carbinol of Formula II thus formed need not be isolated in pure state to enable it to be used in preparing the benzhydrylidene cycloalkanes of the invention. It is sufficient to recover the carbinol from the aqueous reaction mixture by extraction with a suitable organic solvent for the carbinol, including higher aliphatic alcohols, ethers, ketones, hydrocarbons and halogenated hydrocarbons, for instance butyl alcohol, iso-amyl alcohol, diethyl ether, tetrahydrofuran, methyl isobutyl ketone, petroleum ether, cyclohexane, benzene, toluene, chloroform, carbon tetrachloride, trichloro ethylene and the like. The carbinol is then isolated by evaporation of the extract obtained and, if desired, may be purified in conventional manner, for instance by distillation or recrystallization, but is preferably used directly in the form of the evaporation residue as the starting material in preparing the benzhydrylidene cycloalkanes of the invention.

(II) According to another embodiment of the invention, there is used as the starting material p,p'-dihydroxybenzo-phenone or a derivative thereof wherein one of or both the hydroxy groups may be alkylated as described above at item I. As examples of particularly suitable compounds of said kind there may be mentioned: p,p'-dihydroxybenzophenone, p-methoxy-p'-hydroxybenzophenone, p,p'-dimethoxybenzophenone, p,p'-dibenzyloxybenzophenone and the like.

Said benzophenones are reacted with a Grignard reagent having the general formula

(VIII)

wherein R and X have the meanings hereinbefore defined. Said Grignard reagents may be prepared as described above at item I. Examples of suitable Grignard reagents are cyclohexyl magnesium bromide, 2,3-dimethyl cyclohexyl magnesium bromide, cyclooctyl magnesium iodide and the like. The complex formed in this reaction is worked up in the same manner as that described above at item I.

(III) According to still another embodiment of the invention esters are used having the general formula

(IX)

wherein R has the meaning hereinbefore defined and $R_7$ represents a residue of any suitable alcohol, preferably a lower aliphatic alcohol such as a residue of methanol, ethanol or the like. Said esters of Formula IX may be prepared in conventional manner from the corresponding acid and alcohol in the presence of an acid catalyst or from the corresponding acid chloride and the alcohol. As examples of suitable esters of Formula IX there may be mentioned ethyl cyclobutylcarboxylate, methyl 2,4-dimethyl-cyclobutylcarboxylate, methyl 3-methyl-cyclopentyl-carboxylate, butyl 2,5-dimethyl-cyclopentyl-carboxylate, ethyl 3,4-dimethyl-cyclohexylcarboxylate, ethyl cycloheptylcarboxylate, propyl cyclooctylcarboxyoxybenzophenone and the like.

Said esters are reacted with two moles of a Grignard reagent having the general Formula VI. The reaction is carried out in the same manner and the reaction mixture is worked up as described above at item I to obtain the desired carbinol of the general Formula II.

(IV) According to a still further embodiment of the invention ketones are used having the general formula

(X)

wherein R has the meaning hereinbefore defined. Said ketones are reacted with an organometal compound containing the above-mentioned benzhydryl residue. In this embodiment of the invention there is preferably used a lithium compound of the general formula

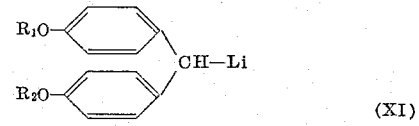

(XI)

wherein $R_1$ and $R_2$ are ether residues of the kind hereinbefore defined. Said compounds are prepared from the corresponding compound containing an additional hydrogen atom instead of the Li atom. Said compound is reacted with phenyl lithium in conventional manner for the preparation of Li compounds of said kind.

The carbinol of Formula II prepared in this manner contains the hydroxy group at the cycloalkyl carbon atom and not at the diphenylmethane carbon atom as do the carbinols prepared by the reactions described above at items I–III but the reaction mixture is nevertheless worked up in the same manner as described at item I.

The carbinol thus obtained is preferably used directly in the form of the evaporation residue of the extract for preparing the benzhydrylidene cycloalkanes of the invention.

Said evaporation of the extract of the carbinol formed may be carried out under various conditions as to time, temperature and pressure. The conditions to be used are generally not critical in any manner but it is preferable to carry out the evaporation at a relatively low temperature and in vacuum, e.g. at a temperature up to about 50° C. at water pump vacuum. In certain cases such as when the solvent employed for the extraction of the carbinol has a boiling point above 50° C. also in vacuum the use of said conditions may be accompanied by some dehydration of the carbinol.

Complete or partial dehydration may also occur when the above-mentioned organometal complex is decomposed by the use of strong acids and insufficient cooling. In this case the desired benzhydrylidene cycloalkane of Formula I is obtained in crude state or in the form of a mixture with the corresponding carbinol. The solvents used for the isolation of said reaction products may be the same as those used for the recovery of the pure carbinol in the manner described at item I.

According to a preferred embodiment of the invention the dehydration is carried out simply by continuing the heating of the residue obtained in the evaporation of the extract of the carbinol. In this case it is suitable to carry out the heating to a temperature between about 50 and 300° C. at atmospheric pressure or preferably in vacuum. Vacuum is suitably employed to assist in removing the water split off from the carbinol from the reaction vessel used, but the pressure to which the reaction vessel is evacuated is not critical in any manner. The dehydration by heating is usually carried out at a pressure of about 5 to 200 mm. of Hg, and preferably at water pump vacuum. The time necessary for dehydration varies according to the quantity of carbinol to be dehydrated but the dehydration should preferably be carried out as fast as possible for instance during a period of from about one to about thirty minutes. In this manner undesirable side reactions are avoided. Any usual distillation equipment may be used for performing the dehydration. However, if the quantity of carbinol to be dehydrated is relatively large a period of time of up to about two hours or more would be necessary. In that case it is more convenient to use a special evaporation apparatus for continuous dehydration where only heating for a short time of the flowing liquid is necessary.

The dehydration may be facilitated by the addition of various materials, such as sulphuric acid, phosphoric acid, phosphorous pentoxide in boiling benzene, alkali metal hydrogen sulphates, e.g. sodium and potassium hydrogensulphate, potassium pyrosulphate, iodine in xylene, hydrogen bromide in acetic acid, p-toluenesulphonic acid, sulphamidic acid, formic acid, acetic acid and anhydrides of lower aliphatic carboxylic acids containing from one to six carbon atoms, e.g. acetic anhydride, and also the corresponding acyl chlorides, e.g. acetyl chloride. The dehydration may also be carried out in aqueous to alcoholic alkali solutions, such as potassium or sodium hydroxide dissolved in water or lower alcohols having one to six carbon atoms or with the corresponding lower potassium or sodium alkoxylates.

The desired benzhydrylidene cycloalkanes of the invention thus formed may be isolated in any conventional manner, such as by distillation at a pressure of for instance 0.001 to 5 mm. of Hg and most preferably at a pressure of from about 0.01 to about 0.2 mm. of Hg. The product may then be further purified by reprecipitation or recrystallization. The desired benzhydrylidene cycloalkanes are obtained as liquids or as solids in good yield and in a pure state.

The product thus obtained may be a mono or dialkyl ether. According to a further embodiment of the invention the alkyl groups may be removed in conventional manner, preferably by reacting the ether with a nucleophilic agent, such as an alkali metal hydroxide, e.g. sodium and potassium hydroxide. The reaction is conveniently carried out in the presence of a polar organic solvent, such as lower alcohols having one to eight carbon atoms, e.g. methanol and ethanol, or in glycol ethers, e.g. triethylene glycol, in aqueous or anhydrous state at increased temperatures and preferably at a temperature of from about 150 to about 250° C. The pressure to be used of course depends on the solvent used. The lower alcohols may be used in an autoclave but the triethylene glycol can be used at atmospheric pressure. The dealkylated benzhydrylidene cycloalkanes of the invention thus obtained, i.e. the free p,p'-dihydroxy compounds, may be isolated in the following manner.

The reaction mixture is diluted with water and neutralized with a suitable acid for example hydrochloric acid, acetic acid and the like. The benzhydrylidene cycloalkane can be extracted with an organic solvent of the group described in connection with the isolation of the corresponding carbinol of Formula II. Upon drying the solution, for instance with anhydrous sodium sulphate or magnesium sulphate the solvent may be removed by distillation and the benzhydrylidene cycloalkane compound may be distilled at reduced pressure, preferably at about 0.001 to 0.1 mm. of Hg. The dihydroxy compounds thus obtained may also be recrystallized from suitable solvents.

According to still another embodiment of the invention the monoalkyl ethers and the free p,p'-dihydroxy compounds are esterified especially with pharmaceutically acceptable acids to form the corresponding mono and diesters.

In the preparation of the esters of organic mono and polybasic aliphatic, cycloaliphatic and aromatic carboxylic acids, it is possible to use the acids themselves. However, the corresponding acyl chlorides and anhydrides are preferably used. The esterification may be carried out in the presence of usual esterification catalysts, such as mineral acids, e.g. sulphuric acid, p-toluenesulphonic acid, cation exchange resins containing sulphonic acid radicals, and the like. The esterification may be carried out in a suitable organic solvent, such as pyridine, if desired.

As examples of pharmaceutically acceptable acids for the preparation of the esters of the invention there may be mentioned sulphuric acid and ortho-phosphoric acid, formic acid, acetic acid, propionic acid, phenylpropionic acid, butyric acid, isobutyric acid, tert.-butylacetic acid, caproic acid, caprylic acid, capric acid, palmitic acid, stearic acid, benzoic acid, succinic acid, glutaric acid, ethoxyacetic acid, ethylmercaptoacetic acid, lactic acid, tartaric acid, citric acid, hexahydrophthalic acid, pivalic acid and the like. Esters with polybasic acids containing free acid groups may be converted to the corresponding salts of pharmaceutically acceptable cations as mentioned above.

The esters may be isolated in the same manner as the corresponding dihydroxy compounds. The reaction mixture is treated with water and the ester is extracted with a suitable solvent, selected from the group used in the isolation of the carbinols of Formula II. The solution is dried and evaporated whereupon the residue obtained is rectificated in vacuum preferably at a pressure of from about 0.01 to 0.1 mm. of Hg. Upon distillation the ester can also be recrystallized from suitable solvents so as to obtain the product in a purer state, if necessary.

In accordance with the statements made above the present invention comprises the following groups of compounds:

(1) Compounds of the general Formula I wherein each phenyl group contains a free hydroxy group in the p-position.

(2) Mono and diesterified p,p'-dihydroxy compounds of the general Formula I.

(3) Mono and dietherified p,p'-dihydroxy compounds of the general Formula I.

(4) Monoesterified-monoetherified p,p'-dihydroxy compounds of the general Formula I.

(5) Mono and diesters of p,p'-dihydroxy compounds of the general Formula I with polybasic acids in which remaining free acid radicals may have been converted to the corresponding salts with alkali metals, alkaline earth metals, ammonia or an amine or to an ester with a suitable alcohol, esp. a lower aliphatic alcohol, such as methanol and ethanol and the like, or to an amide with ammonia or a lower aliphatic amine.

(6) Compounds having the general Formula II, wherein the p,p'-hydroxy groups may be free, or converted to other derivatives as stated above at items 2–5.

The benzhydrylidene cycloalkanes of the invention are valuable compounds. Some are capable of inhibiting the secretion of several pituitary gonadotrophins in the male and female without being at the same time strong estrogens. In some of them the relation between uterotrophic and vaginotrophic activity differs from that of previously known steroidal and non-steroidal agents. Some of them interfere with the remaining production of estrogens in females, probably by an action of the adrenals. Some are able to antagonize the peripheral actions of estrogens. These properties, which can occur singly or in combination, make the compounds useful agents in the treatment of a variety of conditions. A special advantage is that being non-steroidal they cannot by metabolism be changed into compounds having androgenic corticoid or progestational activities. In this respect they differ from steroids having similar activities.

In the male some of them can be useful, where a reduction in the production of androgens is desirable. Since some of the compounds inhibit the secretion of those gonadotrophins which cause spermatogenesis, they can be used for reducing fertility in the male. In all these applications in the male the relative weakness of their estrogenicity is a definite advantage, since feminization is undesirable.

In the female the agents are valuable in their ability to inhibit the secretion of gonadotrophins without being strong estrogens.

The above-mentioned findings have been established by animal tests carried out as described hereinafter.

The animal tests used were a vaginal cornification test in spayed rats, a uterus growth test in infantile mice and a pituitary inhibition test in prepuberal male rats. Estrogenicity in birds was studied in newly hatched chicken. Antiestrogenicity was studied in chicken and mice as described hereinafter. The compounds were compared with stilbestrol and the test for estrogenicity showed that several of the compounds were more active on the pituitary than on the vagina while others are especially weakly acting on the uterus while retaining pituitary inhibitory potency. The benzhydrylidene cyclopentane compound, for instance, was about 5,000 times weaker than stilbestrol on the vagina but only about 1,500 times weaker on the pituitary. Corresponding figures for the benzhydrylidene cyclohexane compound are 1,750 and 750.

It is remarkable that the pituitary inhibition was always achieved without stimulation of the seminal vesicles. This is not the case with estradiol benzoate, stilbestrol and similar compounds and in itself indicates a favourable relation between ability to inhibit the pituitary and stimulatory estrogenic actions.

Some of the compounds are antiestrogenic in tests conducted in the following manner. In the chicken a dose of 0.5 mg./day of estradiol benzoate was combined with 5 mg./day of the compound to be tested, and the resulting oviduct growth over the first 6 days was compared with that resulting in controls from 0.5 mg./day of estradiol benzoate alone. The oviducts of the animals receiving the benzhydrylidene cyclohexance compound weighed 45–50% of the final weight of the controls. The inhibitory potency of the benzhydrylidene cyclopentane compound was less pronounced.

In a uterus growth test 0.12 μg./day of estradiol benzoate was given to control mice and the same dose +30 μg./day of the benzhydrylidene cyclohexane compound to the experimental group. On the fourth day the average uterine weight was 25% smaller in the experimental group.

Thus, some of the compounds have an antiestrogenic action on systemic administration.

The compounds of the invention may be administered as such or together with suitable carriers which are pharmaceutically acceptable. The carrier is selected according to the route of administration to be used as well as according to the physical properties of the compounds and standard pharmaceutical practice.

The invention is further illustrated by means of the following non-limiting examples.

EXAMPLE I

*Preparation of p,p'-dimethoxybenzhydrylidene cyclohexane*

To a Grignard solution of 29 grams of magnesium (1.2 moles) and 225 grams of 4-methoxybromobenzene (1.2 moles) in 500 millilitres of dry ether there was added dropwise with vigorous agitation 63 grams of cyclohexane carboxylic acid ethyl ester (0.4 mole) dissolved in 500 millilitres of dry ether. Upon completion of the addition the reaction mixture was refluxed 2.5 hours with stirring and was then cooled, and a solution of 10 moles of ammonium chloride in 2 litres of water was added. The ethereal layer was separated, washed with water, dried over anhydrous sodium sulphate and distilled. Boiling point: 195—207° C. at 0.3 mm. Upon recrystallization from ethanol the product melted at 110–111° C.

EXAMPLE 2

*Preparation of p,p'-dibenzyloxybenzhydrylidene cyclohexane*

This compound was prepared from a Grignard solution of 16 grams of mg. (0.66 mole) and 158 grams of 4-benzyloxybromobenzene (0.6 mole) in 500 millilitres of dry ether and 32 grams of ethyl cyclohexanecarboxylate (0.2 mole) dissolved in 50 millilitres of dry ether as described in Example 1. Upon recrystallization from ethanol the melting point is 143–145° C. Yield: 69 grams.

EXAMPLE 3

*Preparation of p-hydroxy-p'-methoxybenzhydrylidene cyclohexane*

To a Grignard solution prepared from 110 grams of magnesium (4.5 moles) and 840 grams of p-bromoanisole (4.5 moles) in 1 litre of anhydrous ether, there was added dropwise with vigorous agitation 307 grams of p-hydroxyphenyl cyclohexyl ketone (1.5 moles) dissolved in 1 litre of anhydrous ether. Upon completion of the addition the reaction mixture was refluxed for 2.5 hours with agitation, and was then cooled. Thereupon 15 moles of ammonium chloride dissolved in 3 litres of water were added. The ethereal layer was separated, washed with water, dried over anhydrous sodium sulphate and distilled. Yield: 370 grams. Boiling point 180–190° C. at 0.1 mm. The substance was recrystallized from a mixture of carbon tetrachloride and petroleum ether. Melting point 145–146° C.

EXAMPLE 4

*Preparation of p,p'-dibenzyloxybenzhydrylidene cyclohexane*

A Grignard solution prepared from 19 grams of cyclohexyl chloride in 100 millilitres of ether was filtered and evaporated to dryness. A solution of 45.3 grams of dibenzyloxybenzophenone in 150 millilitres of toluene was added to the cyclohexyl magnesium chloride. After the addition was completed the reaction mixture was refluxed for two hours, whereupon the magnesium complex was decomposed with 2 M hydrochloric acid. The toluene layer was washed with water and dried over anhydrous magnesium sulphate and then evaporated. The residue was recrystallized from a mixture of acetone and chloroform (1:1). The melting point was found to be 139–141° C. The yield was 28 grams.

EXAMPLE 5

*Preparation of p,p'-dihydroxybenzhydrylidene cyclohexane*

A mixture of 118 grams of p-hydroxy-p'-methoxybenzhydrylidene cyclohexane (0.4 mole), 120 grams of potassium hydroxide pellets and 500 millilitres of triethylene glycol was stirred four hours at 220° C. When the reaction mixture was poured into water the substance crystallized, and the crystals were filtered off and washed with water. The substance was then recrystallized from a mixture of ethanol and petroleum ether. Yield: 104 grams. Melting point 235–236° C.

EXAMPLE 6

*Preparation of p,p'-dihydroxybenzhydrylidene cyclohexane*

A solution of 10 grams p,p'-dimethoxybenzhydrylidene cyclohexane and 25 grams of potassium hydroxide in 100 millilitres ethanol was heated in an autoclave to 200° C. for 12 hours. After cooling the reaction mixture was poured into 500 millilitres of water and washed with ether. The aqueous phase was acidified with 6 N hydrochloric acid to about pH 2.5 whereupon the compound crystallized. The crystals were recovered by suction filtration and were washed with 50% (vol./vol.) ethanol. Upon recrystallization from cyclohexane the melting point was 242–245° C.

EXAMPLE 7

*Preparation of p,p'-dihydroxybenzhydrylidene cyclohexane*

A mixture of 23 grams (0.005 mole) of p,p'-dibenzyloxybenzhydrylidene cyclohexane and 95 grams of $PtO_2$ in 150 millilitres of ethanol is hydrogenated at normal pressure and 20° C. After 300 millilitres of hydrogen are absorbed the catalyst is filtered off and the solution is evaporated to dryness. The residue is recrystallized from 50% ethanol and has the melting point 242–245° C. Yield: 0.9 grams.

EXAMPLE 8

*Preparation of p,p'-diacetoxybenzhydrylidene cyclohexane*

56 grams of p,p'-dihydroxybenzhydrylidene cyclohexane (0.2 mole) was mixed with 250 millilitres of acetic anhydride and 500 millilitres of pyridine. The mixture was refluxed for two hours and was then poured into water the substance crystallizing out. The crystals were filtered off and washed with water. Finally the substance was recrystallized from ethanol. Yield: 62 grams. Melting point 135–136° C.

EXAMPLE 9

*Preparation of p-hydroxy-p'-methoxybenzhydrylidene cyclohexane*

98 grams of p-hydroxy-p'-methoxybenzhydrylidene cyclohexane (0.33 mole) was dissolved in 400 millilitres of acetic anhydride and one drop of concentrated sulphuric acid was added. The mixture was then heated for half an hour on the steam bath and poured into water the substance crystallizing out. The crystals were filtered off, washed with water and dilute ethanol, and finally recrystallized from ethanol. Yield: 105 grams. Melting point 109–110° C.

EXAMPLE 10

*Preparation of p,p'-dicaproyloxybenzhydrylidene cyclohexane*

To a solution of 1.5 grams of p,p'-dihydroxybenzhydrylidene cyclohexane 2 grams of caproylchloride were added. The mixture was stirred at 20° C. for 1 hour and was poured into an excess of 2 N hydrochloric acid and ice. The oil formed was extracted with ether. The ethereal extract was washed with water and dried over sodium sulphate. The ether was then evaporated and the compound formed distilled at 195–205° C. at a pressure of 0.005 mm. of Hg $n_D^{20}=1.5469$. The yield after distillation was 1.5 grams.

EXAMPLE 11

*Preparation of disodium p,p'-dihydroxybenzhydrylidene cyclohexane disulphate*

To a well stirred mixture of 12 millilitres of chloro sulphonic acid and 60 millilitres of pyridine, cooled to −10° C., there was added a solution of 15.0 grams of p,p'-dihydroxybenzhydrylidene cyclohexane in 20 millilitres of pyridine. The reaction temperature was kept below 0° C. during the addition, whereupon the mixture was heated to 30–40° C., for one hour and then poured into a saturated solution of sodium hydrogen carbonate in water. The aqueous phase was washed with ether, filtered and neutralized with dilute hydrochloric acid. The precipitated substance was sucked off, washed with water and recrystallized from water. The product consisted of the pyridine salt of the disulphate. This salt was dissolved in 40 millilitres of 1 M sodium hydroxide. The solution was filtered and diluted with 1 litre of acetone and 1 litre of ether. The sodium salt crystallized as long needles which were sucked off and washed with ether. The yield was 12 grams.

EXAMPLE 12

*Preparation of p-hydroxy-p'-methoxybenzhydrylidene cyclopentane*

This substance was prepared from p-hydroxyphenyl cyclopentyl ketone and anisylmagnesium bromide as described in Example 3. Boiling point: 193–197° C. at 0.2 mm. Upon recrystallization from carbon tetrachloride the substance melted at 139–140° C.

EXAMPLE 13

*Preparation of p-acetoxy-p'-methoxybenzhydrylidene cyclopentane*

This substance was prepared from p-hydroxy-p'-methoxybenzhydrylidene cyclopentane as described in Example 9. Melting point: 115–116° C.

EXAMPLE 14

*Preparation of p,p'-diacetoxybenzhydrylidene cyclopentane*

A mixture of 98 grams of p-hydroxy-p'-methoxybenzhydrylidene cyclopentane (0.35 mole), 100 grams of potassium hydroxide pellets and 400 millilitres of triethylene glycol was stirred for five hours at 220° C. The reaction mixture was then poured into water and washed with ether. The aqueous phase was acidified with 5 N hydrochloric acid to about pH 3 and was then extracted with ether. Thereupon the ethereal phase was washed with water, dried over anhydrous sodium sulphate and evaporated into dryness the residue forming crystals. The crude product thus obtained in a yield of 93 grams was dissolved in 400 millilitres of acetic anhydride and one drop of concentrated sulphuric acid was added. Upon heating on the steam bath for half an hour the reaction mixture was poured into water and the crystalline substance separating out was recovered by filtration and washed with water and dilute ethanol. Finally the substance was distilled at 203–208° C. at a pressure of 0.2 mm. Upon recrystallization from ethanol 65 grams of the desired product having the melting point 128–129° C. was obtained.

EXAMPLE 15

*Preparation of p,p'-dimethoxybenzhydrylidene cyclobutane*

This compound was prepared from cyclobutane carboxylic acid ethyl ester as described in Example 1. Boiling point: 173–175° C. at 0.03 mm. Upon recrystallization from ethanol the product melted at 116–117° C.

EXAMPLE 16

*Preparation of p,p'-diacetoxybenzhydrylidene cyclobutane*

This compound was prepared from p,p'-dimethoxybenzhydrylidene cyclobutane as described in Example 14. Boiling point: 205–212° C. at 0.2 mm.

EXAMPLE 17

*Preparation of p,p'-dimethoxybenzhydrylidene cycloheptane*

This compound was prepared from cycloheptane carboxylic acid ethyl ester as described in Example 1. Boiling point: 225–235° C. at 0.03 mm. Upon recrystallization from ethanol the product melted at 64–66° C.

EXAMPLE 18

*Preparation of p,p'-dihydroxybenzhydrylidene cycloheptane*

This compound was prepared from p,p'-dimethoxybenzhydrylidene cycloheptane as described in Example 6. Upon recrystallization from a mixture of ethanol and benzene the yield was 75 grams. Melting point: 159–198° C.

EXAMPLE 19

*Preparation of p,p'-diacetoxybenzhydrylidene cycloheptane*

This compound was prepared from p,p'-dihydroxybenzhydrylidene cycloheptane as described in Example 9. The substance was distilled at 207–215° C. at 0.07 mm. of Hg. Upon recrystallization from ethanol the product melted at 98–101° C. Yield: 42 grams.

EXAMPLE 20

*Preparation of p,p'-dimethoxybenzhydrylidene cyclooctane*

This compound was prepared from 4-methoxybromobenzene and ethyl cyclooctane carboxylate as described in Example 1. Boiling point: 190–200° C. at 0.05 mm. of Hg. Upon recrystallization from ethanol the compound melted at 68–70° C.

EXAMPLE 21

*Preparation of p,p'-diacetoxybenzhydrylidene cyclooctane*

This compound was prepared from p,p'-dimethoxybenzhydrylidene cyclooctane as described in Example 14. Boiling point: 214–217° C. at 0.05 mm. of Hg. Upon recrystallization from ethanol the melting point was 111–113° C.

EXAMPLE 22

*Preparation of p,p'-dimethoxybenzhydrylidene (4-methylcyclohexane)*

This compound was prepared from 4-methoxybromobenzene and ethyl 4-methylcyclohexane carboxylate as described in Example 1. Boiling point: 166–168° C. Upon recrystallization from ethanol the product melted at 47–50° C.

EXAMPLE 23

*Preparation of p,p'-diacetoxybenzhydrylidene (4-methylcyclohexane)*

This compound was prepared from p,p'-dimethoxybenzhydrylidene (4-methylcyclohexane) as described in Example 14. Boiling point: 196–198° C. at 0.15 mm. Upon recrystallization from isopropylketone and from ethanol the product melted at 121–124° C.

EXAMPLE 24

*Preparation of p,p'-dimethoxybenzhydrylidene (3,4-dimethylcyclohexane)*

This compound was prepared from 4-methoxybromobenzene and ethyl 3,4-dimethylcyclohexanecarboxylate as described in Example 1. Boiling point: 180–190° C. Recrystallized from ethanol the substance melted at 64–66° C.

EXAMPLE 25

*Preparation of p,p'diacetoxybenzhydrylidene (3,4-dimethylcyclohexane)*

This compound was prepared from p,p'-dimethoxybenzhydrylidene (3,4-dimethylcyclohexane) as described in Example 14. Boiling point: 222–224° C. at 0.35 mm. Recrystallized from light petroleum the substance melted at 86–88° C.

EXAMPLE 26

*Preparation of p,p'-dimethoxybenzhydrylidene (3-methylcyclopentane)*

This compound was prepared from 4-methoxybromobenzene and ethyl 3-methylcyclopentane carboxylate as described in Example 1. Boiling point: 172° C. at 0.2 mm. Recrystallized from methanol the substance melted at 73–75° C.

EXAMPLE 27

*Preparation of p,p'-dimethoxybenzhydrylidene (4-isopropylcyclohexane)*

This compound was prepared from 4-methoxybromobenzene and ethyl 4-isopropylcyclohexanecarboxylate as described in Example 1. Recrystallized from ethanol the substance melted at 80–81° C.

EXAMPLE 28

*Preparation of p-allyloxy-p'-hydroxybenzhydrylidene cyclopentane*

3.1 grams of p,p'-dihydroxybenzhydrylidene cyclopentane was dissolved in 10 millilitres of methylethyl ketone 3.3 grams of anhydrous potassium carbonate and 2.8 grams of allyl bromide were added to the solution and the reaction mixture was refluxed for 7 hours. Then the reaction mixture was poured into 25 millilitres of water. The precipitate formed was extracted with ether. The ethereal solution was washed with water, dried over anhydrous magnesium sulphate, evaporated to dryness and distilled. Upon recrystallization from ethanol the melting point was 46–48° C. The yield was 3.0 grams.

EXAMPLE 29

*200 mg. tablets*

200 milligrams of p,p'-dihydroxy-benzhydrylidene cycloheptane, 100 mg. of powdered sugar, and 64 mg. of corn starch are mixed and granulated with a 10% gelatin solution. The granulation is dried and ground to fine granules for tableting. About 1% of magnesium stearate is added as a lubricant together with sufficient corn starch to give a weight of 600 mg. per tablet. The product is compressed on a single punch or rotary machine using a 9/32 inch punch.

EXAMPLE 30

*500 mg. tablets*

500 mg. of p,p'-diacetoxy-benzhydrylidene cyclooctane, in finely powdered form is admixed with 60 mg. of corn starch and 100 mg. of powdered sugar and then granulated with a 10% gelatin solution. The granulation is dried and ground to size suitable for tableting. About 1% of magnesium stearate is added as a lubricant, together with sufficient corn starch to give a weight of 700 mg. per tablet. The product is compressed on a single punch or rotary machine using a 7/16 inch punch.

The tablets of Example 1 and Example 2 may be suitably coated if desired, as, for example, with sugar.

EXAMPLE 31

*Injectable suspension, 100 mg. per ml.*

The following ingredients are sterilized separately: 100 mg. of p-methoxy-p'-acetoxy-benzhydrylidene cyclohexane, 0.1 mg. of Tween 80 and q.s. of corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

EXAMPLE 32

*10% ointment*

To a melt of 1.5 lbs. of propylene glycol, 6 lbs. of polyethylene glycol 400 USP and 6 lbs. Carbowax 4000 USP is added 1.5 lbs. of micropulverized p,p′-dimethoxybenzhydrylidene cyclopentane. The product is stirred until almost solid and milled if necessary to a smooth ointment. The ointment is filled into suitable containers.

What we claim is:

1. Compounds containing a cycloalkyl group, corresponding to the following formula:

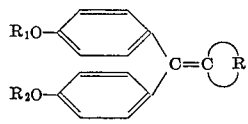

wherein R is a member selected from the group consisting of unsubstituted saturated straight and branch-chained alkylene radicals containing from 4 to 8 carbon atoms wherein said R together with the carbon atom to which it is attached forms a ring containing from 5 to 6 carbon atoms, and $R_1$ and $R_2$ are selected from the group consisting of hydrogen, alkyl radicals containing from 1 to 6 carbon atoms, alkenyl radicals containing from 2 to 6 carbon atoms, phenyl alkyl radicals in which the alkyl radical contains from about 1 to about 3 carbon atoms, and pharmaceutically acceptable acyl radicals.

2. The compound according to claim 1, wherein R is the divalent —$CH_2$—$CH_2$—$CH_2$—$CH_2$—.
3. The compound according to claim 1, wherein R is the divalent —$CH_2$—$CH_2$—$CH_2$—$CH_2$—$CH_2$—.
4. The compound p,p′-dihydroxybenzhydrylidene cyclopentane.
5. The compound p,p′-dihydroxybenzhydrylidene cyclohexane.
6. The compound p,p′-diacetoxybenzhydrylidene cyclohexane.
7. The compound p-hydroxy p′-methoxy-benzhydrylidene cyclohexane.
8. The compound p,p′-dicapropyloxybenzhydrylidene cyclohexane.
9. The compound p,p′-dimethoxybenzhydrylidene (4-methyl cyclohexane).

References Cited by the Examiner

UNITED STATES PATENTS 2,429,556 10/1947 Longfellow et al. ___ 260—619
2,950,266 8/1960 Goldblum.

FOREIGN PATENTS 537,976 7/1941 Great Britain.

OTHER REFERENCES

Dodds et al.: Proc. Royal Soc. London, vol. 127 B (1939), pages 140–166 (27 pages).

Solmssen: Chem. Reviews, 37:553, 558 (1945; 2 pages).

LEON ZITVER, *Primary Examiner.*

CHARLES B. PARKER, *Examiner.*

H. G. MOORE, J. E. EVANS, *Assistant Examiners.*